LINEFINDER AND CONTROL CIRCUITS

Filed May 11, 1959 7 Sheets-Sheet 1

INVENTORS
J. E. COX, H. L. HORWITZ
G. L. HASSER & S. J. WESTHEAD
BY [signature]
ATTORNEY May 29, 1962 H. L. HORWITZ ETAL 3,037,084

LINEFINDER AND CONTROL CIRCUITS

Filed May 11, 1959 7 Sheets-Sheet 3

LINEFINDER AND CONTROL CIRCUITS

LINEFINDER AND CONTROL CIRCUITS

Filed May 11, 1959 7 Sheets-Sheet 6

3,037,084
LINEFINDER AND CONTROL CIRCUITS

Henry Leopold Horwitz, Nutley, George Louis Hasser, Packanack Lake, and John Edward Cox and Stanley John Westhead, Rutherford, N.J., assignors to International Telephone and Telegraph Corporation, New York, N.Y., a corporation of Maryland Filed May 11, 1959, Ser. No. 812,499
24 Claims. (Cl. 179—18)

This invention relates to telephone systems and more particularly to linefinders and simplified common control circuits therefor.

It is old in the art of automatic telephony to provide means for seeking and finding a subscriber line having an unanswered calling condition thereon, such means being commonly called "linefinders." It has been found that linefinders do not have to be provided on a basis which allows all subscribers to place calls at once, since on the average, not over 7% of the lines will have a calling condition at any given time. As with all statistics, there are deviations from the average; however, such deviations may also be predicted on the basis of a stated grade of service, i.e. the percentage of time that an all-finders-busy condition is encountered. If the sample is large enough, the deviations are relatively minor; whereas, if the sample is small, the deviations become increasingly important. For example, on the average, seven subscriber lines of each 100 are busy simultaneously regardless of the number of lines in a group, but in order to provide service of a grade wherein an all-finders-busy condition is encountered no more than 1% of the time, 14 linefinders per group must be provided if the lines are divided into groups of 100 lines each. For the same grade of service, only 24 linefinders per group must be provided if the lines are divided into 200 line groups. In this manner, there may be a savings of 4 linefinders if a group is enlarged from 100 lines to 200 lines.

Further increasing the number of lines per group adds to the efficiency of the system so that the number of linefinders ultimately approaches the optimum of 7 linefinders per 100 lines. However desirable it may be to provide an infinite number of lines per group, the complexity of the equipment increases out of proportion to the increased efficiency so that the savings in equipment is soon surpassed by a cost which is chargeable to the increased complexity of individual items of switching equipment. Therefore, there is a constant need for simpler equipment that is designed to serve a greater number of lines.

An object of this invention is to provide new and improved linefinding equipment.

Another object of the invention is to provide simple linefinder equipment having a 100% availability to a relatively large group of lines but also having the simple operation that is possible with a relatively small group of lines.

Yet another object of the invention is to provide flexible linefinding service for a mixture of different types of subscriber line equipment.

In accordance with this invention, these and other objects are accomplished by means for extending connections through a telephone system which is shown in the form of a step-by-step linefinder that is provided with a plurality of levels each of which comprises upper and lower sets of terminal contacts. When a call is initiated, the wipers of the linefinder are elevated to a particular level according to certain markings that are extended from a line circuit in an off-hook or calling condition. An auxiliary switch that is common to a group of linefinders is operated simultaneously with primary finder switch motion to provide level markings which adapt the linefinders to serve different types of subscriber line equipment. Thereafter, the linefinder rotates its wipers to search for markings that are individual to particular sets of terminals. Finally, there is a selection of either the upper or lower set of terminals, thus completing a selection of the calling line.

Only two relays are required for each individual linefinder. Both relays operate responsive to an off-hook condition to associate a preassigned linefinder with common control equipment. Thereafter, one of the relays releases to select an upper or lower set of terminals, while the other relay remains operated to hold the linefinder until the call is completed. All other relays that are required to complete linefinder operation are in the common control circuit mentioned above. The common control circuit is assigned to an individual linefinder only during the brief period of the time while a calling line is being found. Thereafter, the common control circuit may be disconnected from such linefinder and be assigned to serve other linefinders without regard to conversations which may be in progress through previously operated finders.

In order to avoid the complexity of overly large line groups, the linefinders are subdivided into two smaller groups, hereinafter called groups "A" and "B." Group "A" linefinders are adapted to serve half of the subscriber lines in a group under normal conditions, while group "B" linefinders are adapted to serve the other half of the subscriber lines in a group under normal conditions. To permit further simplification, two finder control circuits ("A" and "B") are provided corresponding to the linefinder grouping. Under normal operating conditions, all subscriber lines connected to a first group of levels are served by groups "A" linefinders under the influence of control circuit "A" while all subscriber lines appearing in a second group of levels are served by linefinders in group "B" under the influence of control circuit "B"—except that the two groups of levels are slip multipled so that each appears as levels 1—5 in the group of linefinders that normally serves it. Thus, two calls may be handled simultaneously—one by group "A" equipments and the other by group "B" equipments. Normally, no linefinder is stepped higher than its fifth level. On the other hand, if trouble occurs, the finders of group "A" may be operated by control circuit "A" to step into levels 6—0, thereby absorbing the functions of finders in group "B." Conversely, finders in group "B" may take over the functions of finders in group "A." In a similar manner, control circuit "A" may be switched to control the finders of group "B" and vice versa. In this manner, all equipment is available to all other equipment on a 100% availability basis.

The above mentioned and other objects of this invention together with the manner of obtaining them will become more apparent and the invention itself will be better understood by reference to the following description of an embodiment of the invention taken in conjunction with the accompanying drawings wherein.

Figure 6:
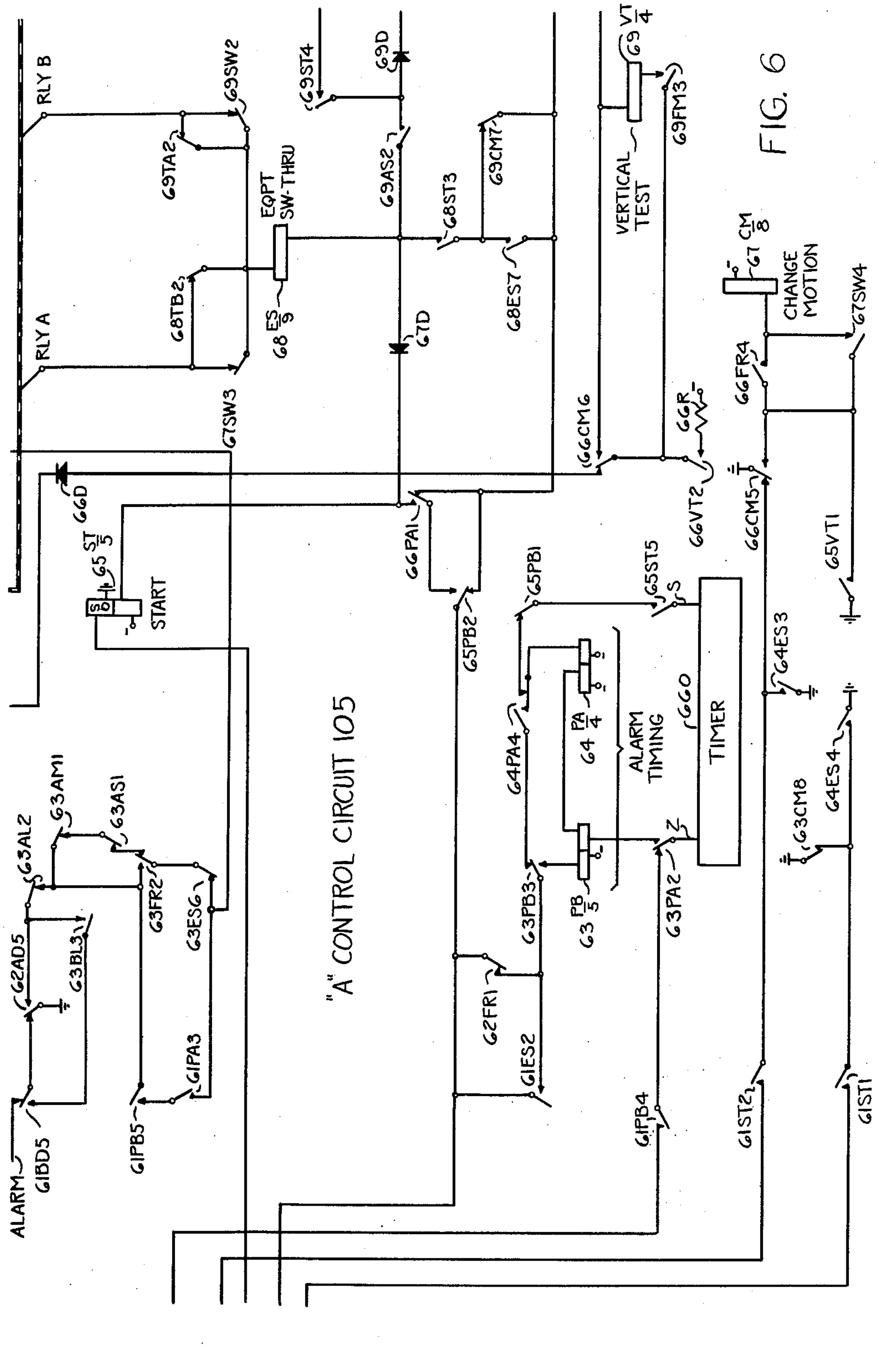
FIGS. 6 and 7 (when properly joined) show details of a control circuit.
Figures 7, 8, 9:
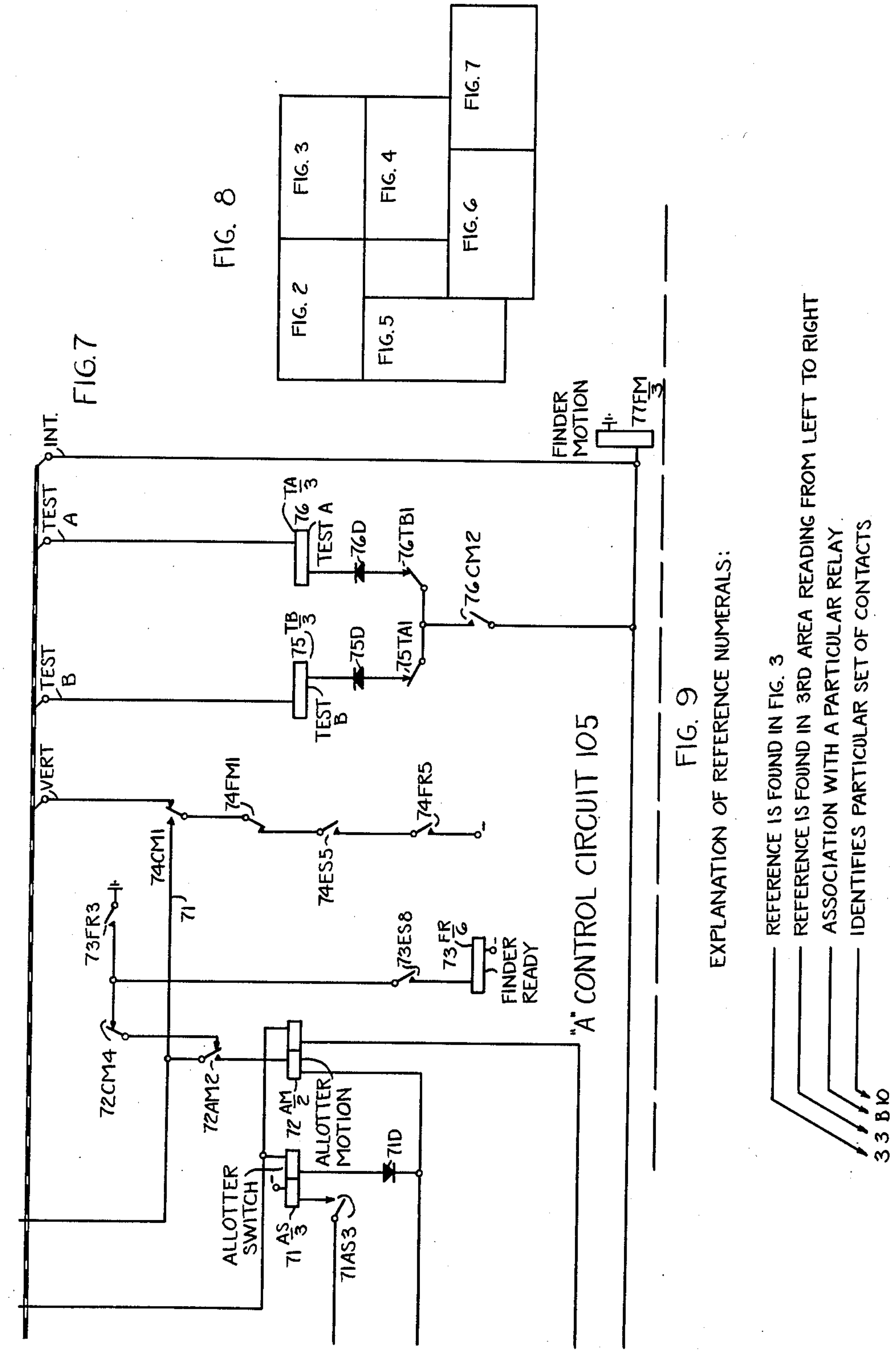
FIG. 8 shows the manner in which FIGS. 2–7 should be joined to provide a complete and understandable circuit.
FIG. 9 explains the reference numeral system.

Detached-contact drawings are used; that is, relay windings and associated contacts are separated in order that each may appear in the drawings at the most convenient location. Each relay is identified by two letters which indicate its functional name. A denominator to the two letters indicates the total number of contacts that are controlled by such relay. Moreover, each set of contacts associated with a relay is identified by the same two letters plus a suffix that indicates an individual set of contacts controlled by such relay. All reference numerals have a prefix, the first digit of which identifies the figure and the second digit of which identifies the area in a figure (left-to-right) in which a component appears. For example, "finder ready" relay 73FR/6 appears in the third area of FIG. 7 and has six sets of contacts, one set being contacts 74FR5 which is found in the fourth area of FIG. 7 and another set being contacts 62FR1 that appears in the second area of FIG. 6.

Where possible, simple terms are used and specific items are described hereinafter to facilitate an understanding of the invention; however, it should be understood that the use of such terms and reference to such items are not to act in any manner as a disclaimer of the full range of equivalents which is normally given under established rules of patent law. To illustrate, the drawings show two-motion vertical and rotary switches; whereas, flat-type and other type switches may also be used. Moreover, certain auxiliary functions are shown as being provided by rotary or minor switches when it is apparent that other devices such as chains of counting relays, gas tubes, or the like may be used. Quite obviously, other examples could be selected to illustrate the manner in which the specific terms that have been used are entitled to a wide range of equivalents.

BRIEF DESCRIPTION

Figure 1:
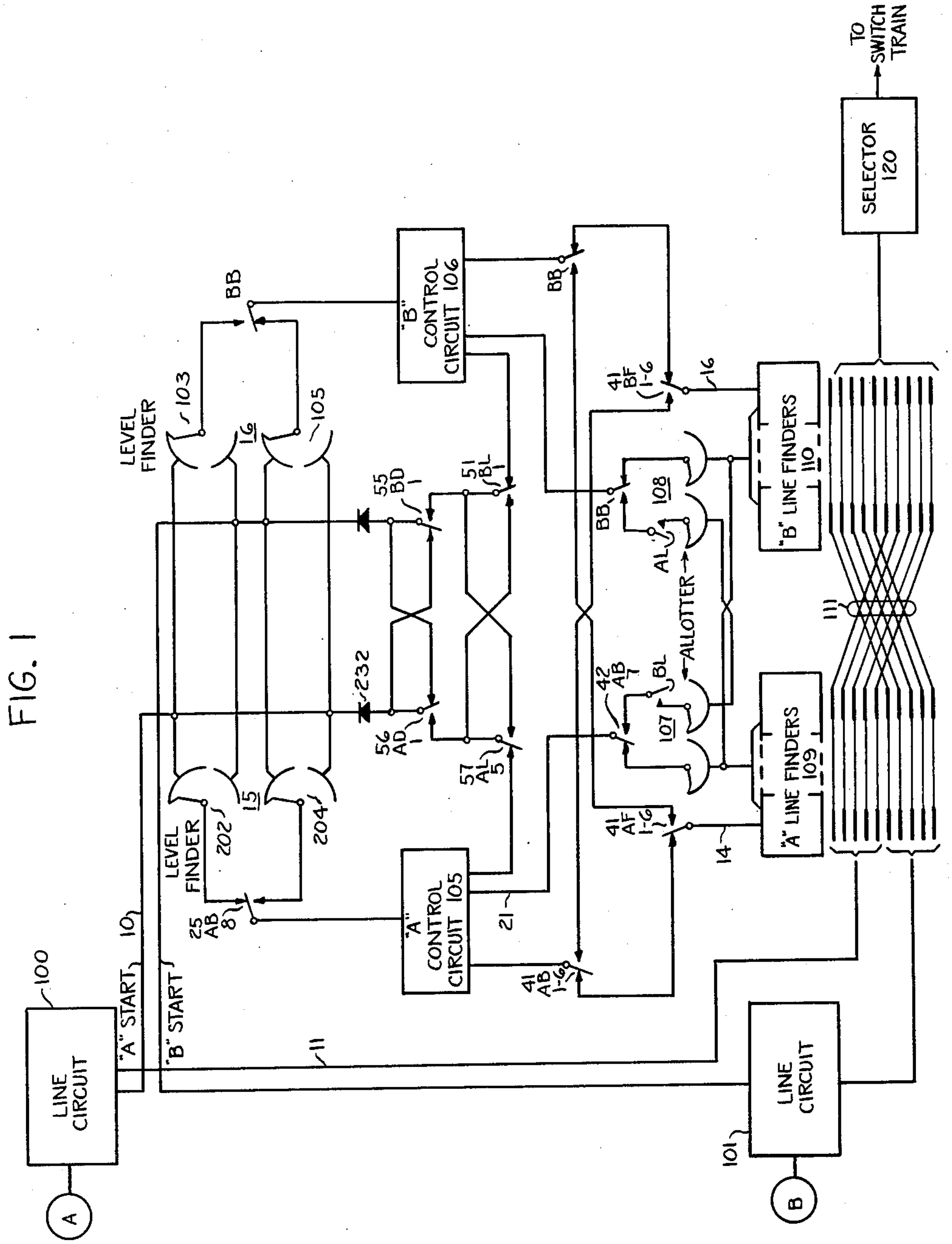
FIG. 1 shows by block diagram, a telephone system adapted to utilize the subject invention.

Briefly, FIG. 1 shows a portion of a telephone system which is disclosed in greater detail in the remainder of the drawings. For the purposes of this description, there are shown two calling subscriber lines designated "A" and "B." Both subscriber lines appear in the same multiple of linefinder banks except that subscriber line "A" represents lines that appear in the first five levels of "A" linefinders 109 and subscriber line "B" represents lines that appear in the first five levels of "B" linefinders 110 as indicated by cabling 111. Prior to the initiation of a call, allotter switch 107 preselects and interconnects a linefinder from group 109 with "A" control circuit 105 via conductor 21. Thus, "A" control circuit 105 normally controls "A" linefinders 109 which serve subscribers connected to their first five levels; whereas, "B" control circuit 106 normally operates "B" linefinders 110 which normally serve subscribers connected to their first five levels. If required, each group of linefinders may serve all subscriber lines.

If it is assumed, for the purposes of this description, that subscriber "A" is calling, any suitable hookswitch contacts (not shown) may be operated responsive to the removal of a handset or a receiver, as the case may be. Responsive thereto, a marking is extended over the circuit including conductor 10 (which is also designated "A START"), a diode such as 232 which is individual to a finder level, through normally operated contacts 56AD1 and normally released contacts 57AL5 to "A" control circuit 105. Responsive to such marking, control circuit 105 extends suitable control signals over contacts 41AB1–6, 41AF1–6, and conductor 14 to control the preselected linefinder of group 109. As control circuit 105 steps the preselected linefinder step-by-step over its levels, level finder brushes 202 and 204 are driven simultaneously over corresponding sets of terminals. Eventually, brush 202 encounters the marking extended over conductor 10; whereupon, a signal is returned via contacts 25AB8 to the "A" control circuit 105 which responds by stopping the primary switch motion of finder 109.

Thereafter, finder 109 moves in its secondary direction in search of a particular set of terminals which are marked by line circuit 100 over cabling 111. After linefinder 109 has seized the calling subscriber line circuit 100, the call may be extended through selector 120 and a switch train in any well known manner.

If it is assumed that "A" control circuit 105 is temporarily inoperative, contacts 56AD1 return to the normal position as shown in the drawings. If subscriber "A" initiates a call thereafter, a marking on start conductor 10 is extended through released contacts 56AD1, operated contacts 55BD1 and released contacts 51BL1 to "B" control circuit 106. If there is such a transfer to "B" control circuit 106, relays BL and AL co-operate to give control circuit 106 access not only to its "B" linefinder group 110 but also to "A" group 109 via allotter 108. In this manner, either control circuit 105 or 106 may take-over the function of the other control circuit if and as required. Moreover, when such take-over occurs, there is a 100% accessibility from the operative control circuit to all linefinders of both groups. If a fault condition occurs in the "B" or operative control circuit after transfer, control of the linefinders is returned to the "A" control circuit. If the "A" control circuit is still faulty, control is passed back to the "B" control circuit, etc. In this manner, control of the linefinders is alternated between the two control circuits until the faults are cleared.

On the other hand, if conditions should incapacitate one of the linefinder groups, a transfer relay operates, to give both control circuits access to the remaining linefinders, as at contacts 41AB1–6, for example.

Level finder switches 15 and 16 are of a type which is usually provided with a plurality of levels of bank contacts. The additional levels may be wired to line circuits such as 100 or 101, to provide for a variety of service features responsive to level markings.

DETAILED DESCRIPTION

The detailed drawings (FIGS. 2–7) show the circuits which are necessary to complete boxes 105, 106, 109 and 110 of FIG. 1. It should be understood that control circuits 105 and 106 are identical and that linefinder circuits 109 and 110 are identical.

*An idle linefinder.*—Normally, finder busy relays 57AD and 52BD are operated; therefore, ground potential is extended from contacts 62AD5 through contacts 63AL2, 63AM1, 63AS1, 63FR2, 63ES6, and the winding of allotter magnet 430 to battery. Responsive to the operation of magnet 430, interrupter contacts 43I close to extend battery through contacts 43I, the right-hand winding of allotter motion relay 72AM, contacts 65PB2, and 58AL2 to master ground, thus operating relay 72AM. As the name implies, "master ground" is that potential to which most equipment locks when operated. If master ground is removed, the various circuits release.

Responsive to the operation of allotter motion relay 72AM, contacts 72AM2 close, thereby connecting a test circuit which extends from battery through the winding of lower level relay 33B, contacts 33A8, off-normal contacts 34ON (opened or closed depending upon whether the linefinder is busy or idle), a particular terminal in the left-hand bank of allotter 107 (such terminal being individual to a linefinder in group 109), contacts 42AB7, 72AM2, the left-hand winding of allotter motion relay 72AM, diode 71D, the right-hand winding of relay 71AS and interrupter contacts 43I to battery. Relay 72AM also opens its contacts 63AM1, thereby disconnecting and releasing allotter magnet 430.

Responsive to the release of allotter magnet 430, the wipers of allotter 107 are advanced one step and contacts 43I are opened.

If the terminals to which the allotter has advanced represent a busy linefinder, off-normal contacts, 34ON are open and no battery is extended to allotter motion relay 72AM which, therefore, releases. That is, the left-hand winding of relay 72AM does not receive battery from conductor 21 (FIG. 4) and the right-hand winding of relay 72AM is opened by the allotter magnet interrupter contacts 43I.

Responsive to the release of allotter motion relay 72AM, contacts 63AM1 close, thus recompleting the circuit extending from ground at contacts 62AD5 through contacts 63AL2, 63AM1, 63AS1, 63FR2, 63ES6, and the winding of allotter magnet 430 to battery. Responsive to such energization, magnet 430 operates and releases once more to step the wipers of allotter switch 107. When magnet 430 closes its interrupter contacts 43I, a circuit is completed to master ground at contacts 58AL2 through contacts 65PB2, the right-hand winding of relay 72AM and interrupter contacts 43I to battery. Relay 72AM operates and opens its contacts 63AM1, thereby releasing allotter magnet 430. The interaction between allotter motion relay 72AM and the allotter magnet 430 continues until an idle linefinder is found.

Figure 3:
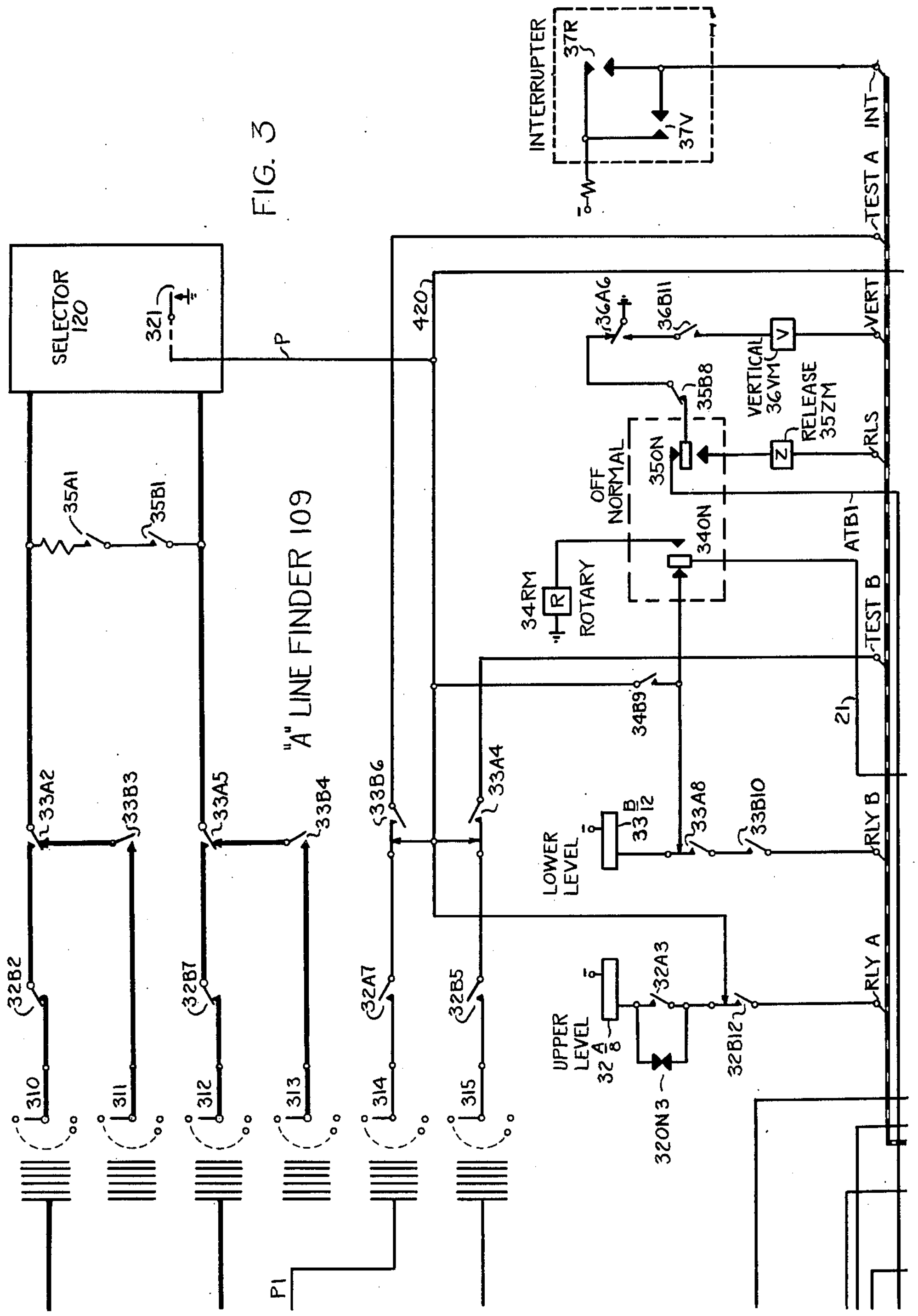
FIG. 3 shows the details of a linefinder.
Figure 4:
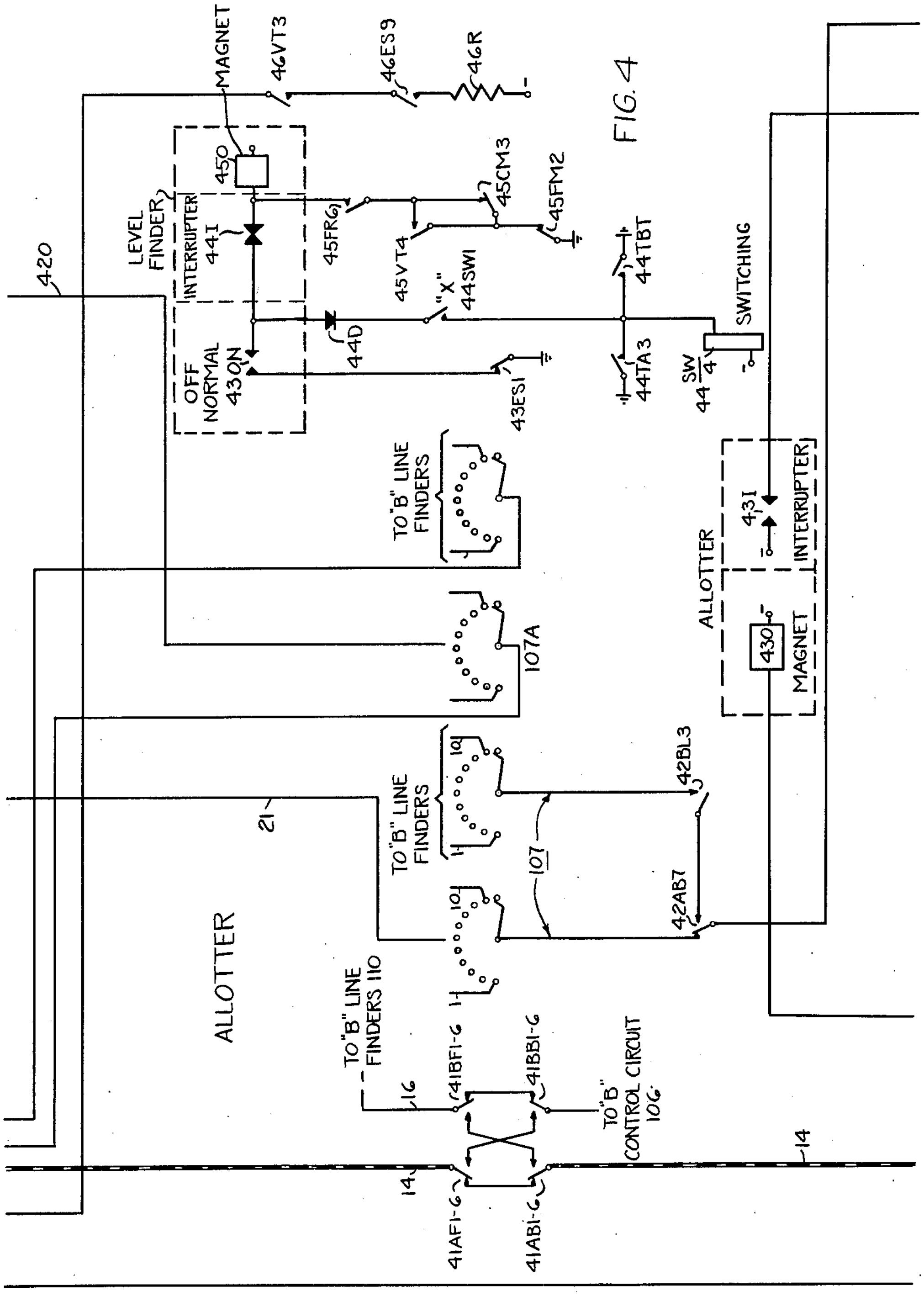
FIG. 4 shows an allotter adapted to preselect a particular linefinder.
Figure 5:
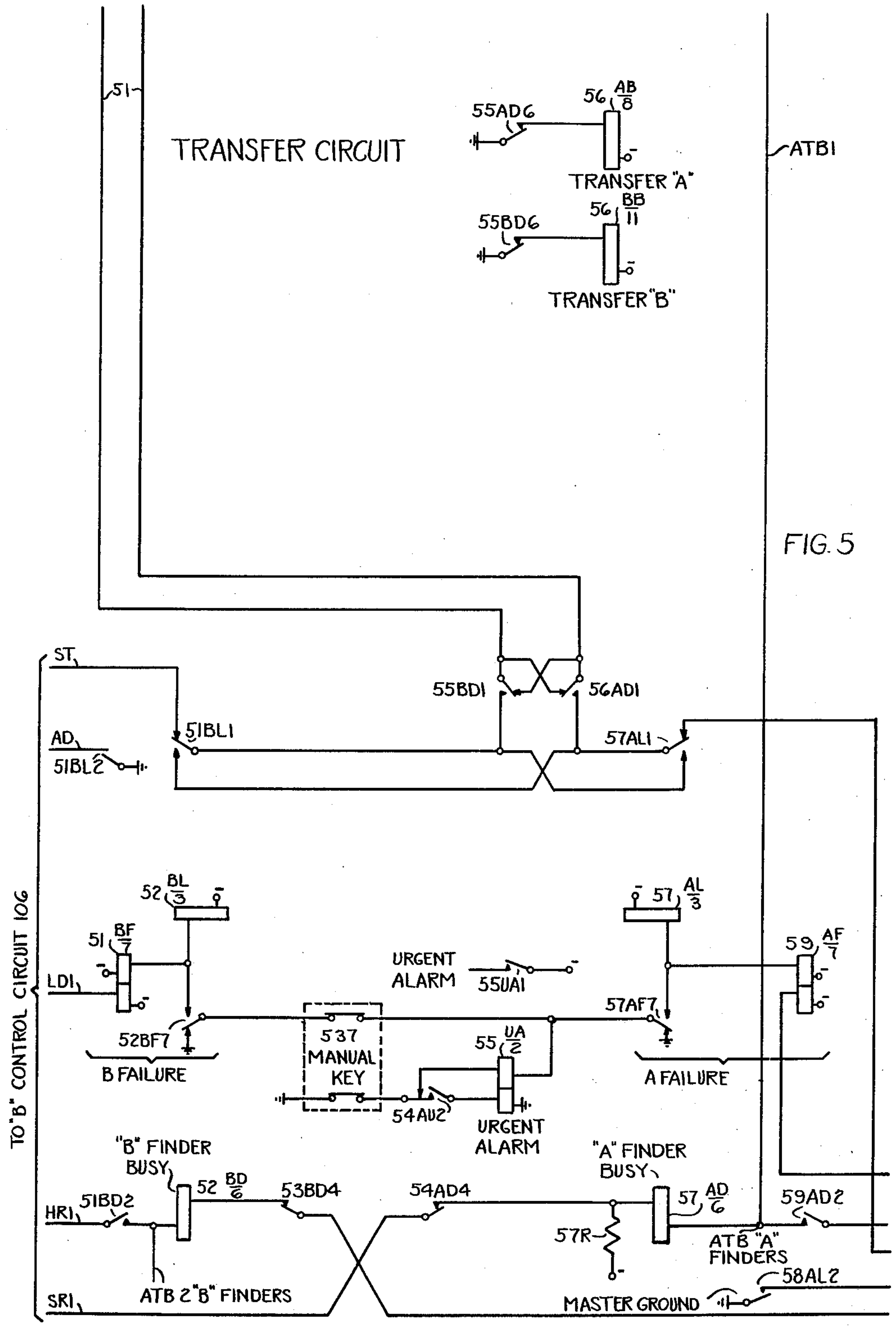
FIG. 5 shows a transfer circuit for switching controller and finder groups.

An idle linefinder is indicated by closed off-normal contacts 34ON (as shown in FIG. 3). As a result, a battery potential is extended through the winding of lower level relay 33B, contacts 33A8, off-normal contacts 34ON, conductor 21, a particular step in the left-hand bank of allotter 107, contacts 42AB7, operated contacts 72AM2, the left-hand winding of allotter motion relay 72AM, diode 71D, the right-hand winding of relay 71AS, the right-hand winding of relay 72AM, contacts 65PB2, and contacts 58AL2 to master ground. The resistances of the various windings are such that relays 71AS and 72AM operate but relay 33B does not operate. Allotter motion relay 72AM holds contacts 63AM1 open to prevent further stepping of the allotter.

*Call placed.*—For the purposes of this description, it is assumed that the linefinder of FIG. 3 is connected to control circuit 105 (FIGS. 6 and 7) when a call is initiated by subscriber station "A" which is connected to a terminal in the second level of the finder.

Responsive to the removal of a handset or receiver at the station "A," hookswitch contacts (not shown) close to operate line relay 22C. Responsive thereto, contacts 222 close and a battery marking potential is connected to one of the terminals that is accessible to wiper 314 (FIG. 3). Also responsive to the operation of line relay 220, contacts 221 close and a battery potential is extended over conductor 10, through diode 232, operated contacts 56AD1, contacts 57AL1, and the upper winding of start relay 65ST to ground.

Parenthetically, if the calling subscriber station were connected to level 7, for example, a circuit would have been completed through diode 237, contacts 55BD1, and 51BL1 to the "B" control circuit.

Responsive to the operation of start relay 65ST, a circuit is completed for operating relay 33B which may be traced from master ground at contacts 58AL2, through contacts 65PB2, 69CM7, 68ST3, 69AS2, diode 69D, the left-hand winding of allotter motion relay 72AM, contacts 72AM2, contacts 42AB7, a wiper and terminal in allotter 107, conductor 21, off-normal contacts 34ON, contacts 33A8, and the winding of lower level relay 33B to battery. A circuit is also completed from master ground at contacts 58AL2 through contacts 65PB2, 69CM7, 68ST3, 69AS2, 69ST4, 71AS3, and the left-hand winding of allotter switch relay 71AS to battery. Also responsive to the operation of start relay 65ST, a locking circuit is completed from master ground at contacts 58AL2 through contacts 65PB2, 69CM7, 68ST3, diode 67D, and the lower winding of start relay 65ST to battery. Contacts 65ST5 close, thus extending a circuit from "TIMER" 660 through contacts 65ST5, 65PB1, 64PA4, and the right-hand winding of relay 64PA to battery. The "TIMER" 660 starts to measure a period of time during which a normal call may be completed, thus detecting a failure to find (as explained later). Contacts 61ST1 and 61ST2 have no effect at this time.

*Control of the linefinder.*—The linefinder is controlled via a cable or group of wires marked 14 which extend from FIG. 2 through FIG. 4 to FIGS. 6 and 7. These wires are effectively connected only during a period when "A" control circuit 105 is causing linefinder 109 to operate. Although the conductors of cable 14 are common to all group "A" linefinders, only one linefinder may be associated therewith at any given time.

Means is provided for operating both upper level selecting relay 32A and lower level selecting relay 33B to interconnect the linefinder and common control circuit. Responsive to the operation of lower level relay 33B, contacts 32B12 close to complete a circuit via the conductor marked "RLY. A"; whereupon, upper level relay 32A and equipment switch-through relay 68ES operate in series over a circuit which may be traced from battery through the winding of upper level relay 32A, off-normal contacts 32ON, operated contacts 32B12, conductor "RLY. A," cable 14, contacts 67SW3 and 68TB2 in parallel, the winding of equipment switch-through relay 68ES, contacts 68ST3, 69CM7, 65PB2, and contacts 58AL2 to master ground. It is noted that after upper level relay 32A operates, relays 32A and 33B are connected in parallel—one circuit branch being via contacts 32A3, 32B12, cable 14, contacts 67SW3, and the other circuit branch being via contacts 33A8, 33B10, cable 14, and contacts 69SW2. This parallel circuit is, in turn, series connected through relay 68ES, contacts 68ST3, 68ES7 and 65PB2 to master ground at contacts 58AL2. Contacts 32B2, 33B3, 33B4, and 32B7 operate together with contacts 33A2 and 33A5 to open the heavily inked talking conductors. Contacts 33A4, 32A7, 32B5, and 33B6 operate to prepare circuits extending to the conductors marked "TEST A" and "TEST B"; however, there is no effect at this time since contacts 76CM2 are now standing open. Contacts 35A1 and 35B1 close to complete a loop across the heavily inked talking conductors for seizing a selector 120 that is permanently associated with linefinder 109. Also responsive to the operation of relay 32A, contacts 33A8 operate to disconnect relay 33B from conductor 21 over which allotter motion relay 72AM is holding operated; therefore, relay 72AM restores.

Responsive to the operation of equipment switch-through relay 68ES, as explained above, various circuits are prepared, but there is no immediate effect at this time.

*Vertical linefinder motion.*—Responsive to the seizure of selector 120, as explained above, ground is returned from contacts 321 over conductor P in any suitable manner to operate finder ready relay 73FR over a circuit which may be traced from ground on contacts 321, conductor P through operated contacts 34B9, off-normal contacts 34ON, conductor 21, a terminal and wiper in the left-hand bank of allotter 107, contacts 42AB7, contacts 72AM2, 72CM4, operated contacts 73ES8, and the winding of finder ready relay 73FR to battery.

Responsive to the operation of finder ready relay 73FR, contacts 73FR3 close, thus completing a locking circuit which may be traced from ground through contacts 73FR3, 73ES8, and the winding of relay 73FR to battery. Contacts 66FR4 close to prepare a holding circuit for change motion relay 67CM; however, there is no immediate effect since contacts 66CM5 are open at this time. Contacts 45FR6 close to complete a circuit for operating level finding magnet 450, the circuit being as follows: battery, the winding of magnet 450, contacts 45FR6, 45CM3, and 45FM2 to ground. Contacts 74FR5 close to complete a circuit for operating vertical magnet 36VM as follows: ground, operated contacts 36A6, 36B11, the winding of vertical magnet 36VM, conductor "VERT," cable 14, contacts 74CM1, 74FM1, 74ES5, and 74FR5 to battery.

The line finder takes one step in its primary or vertical direction. Responsive thereto, interrupter springs 37V close to operate finder motion relay 77FM over a circuit which may be traced from ground through the winding of relay 77FM, conductor "INT," cable 14, operater interrupter contacts 37V, and a resistor to battery.

Upon the operation of finder motion relay 77FM, contacts 74FM1 operate to remove the battery marking from the conductor marked "VERT," thus releasing vertical magnet 36VM to complete the first step in the vertical direction. Contacts 69FM3 close to prepare a circuit for vertical test relay 69VT which may or may not operate depending upon whether the calling line is connected to the first level. Since it has been assumed for the purposes of this description that the calling subscriber is in level 2, vertical test relay 69VT does not operate at this time. Contacts 45FM2 open to break a circuit extending to level finder magnet 450, thus releasing it to complete its operation cycle. Level finding wipers 202 and 204 are now standing in engagement with their first associated terminals.

Responsive to the release of vertical magnet 36VM, vertical interrupter springs 37V open, thus breaking the operate circuit for finder motion relay 77FM which restores.

When finder motion relay 77FM releases, a circuit is completed for operating vertical magnet 36VM over a path which may be traced from ground through contacts 36A6, 36B11, the winding of vertical magnet 36VM, the conductor marked "VERT," cable 14, contacts 74CM1, 74FM1, 74ES5, and 74FR5 to battery. Contacts 45FM2 close to operate level finder magnet 450, over a circuit which extends from battery through magnet 450, contacts 45FR6, 45CM3, and 45FM2 to ground.

Linefinder 109 is now standing on its second level, and level finder switch wiper 202 has been driven to engage its second associated terminal. Since it has been assumed for the purposes of this description that the calling line is connected to the second level of the finder switch, a circuit may be traced from battery on contacts 221 in the calling subscriber's line circuit through contacts 213, conductor 10, conductor 2, wiper 202, contacts 25AB8, diode 66D, contacts 66CM6, 69FM3, the windings of vertical test relay 69VT and of relay 77FM to ground. Therefore, finder motion relay 77FM remains operated after vertical interrupter contacts 37V open at the end of the second step. Thus, contacts 74FM1 and 45FM2 remain closed so that the switch does not take any further steps vertically and the level finding switch is not operated a third time. Primary or vertical switch motion has ended.

Responsive to the operation of vertical test relay 69VT, contacts 66VT2 close to complete a holding circuit which may be traced from battery through resistor 66R, operated contacts 66VT2, 69FM3, and the windings of vertical test relay 69VT and of finder motion relay 77FM to ground. Contacts 65VT1 close to complete a circuit which may be traced from ground through contacts 65VT1, 66FR4, and the winding of change motion relay 67CM to battery.

*Rotary linefinder motion.*—When change motion relay 67CM operates, contacts 74CM1 open, thus breaking the stepping circuit which drove the switch in its vertical motion. Contacts 45CM3 open one circuit to magnet 450 of the level finding switch. Contacts 66CM6 operate to complete a circuit for shunting vertical test relay 69VT such shunt circuit including the winding of relay 69VT and contacts 69FM3.

Responsive to the release to vertical test relay 69VT, contacts 66VT2 open to break the holding circuit for relays 69VT and 77FM both of which release, and contacts 45VT4 open to release magnet 450.

Upon the release of finder motion relay 77FM, contacts 74FM1 close to operate rotary switch magnet 34RM over the circuit extending from battery through contacts 74FR5, 74ES5, 74FM1, 74CM1, conductor 71, contacts 42AB7, the left-hand wiper and contacts of allotter 107, conductor 21, operated off-normal springs 34ON, and the winding of rotary magnet 34RM to ground.

Responsive to the operation of magnet 34RM, brushes 310—315 of finder switch 109 are rotated one step into the second level. Near the end of the step, rotary interrupter springs 37R close to operate relay 77FM over a circuit extending from battery through interrupter contacts 37R, the conductor marked "INT," and the winding of finder motion relay 77FM to ground.

When finder motion relay 77FM operates, contacts 74FM1 open to break the circuit extending to rotary switch magnet 34RM which releases. Responsive thereto, interrupter contacts 37R open, thus releasing relay 77FM. When finder motion relay 77FM releases, contacts 74FM1 close to recomplete the circuit through the winding of rotary magnet 34RM. This interaction between magnet 34RM and finder motion relay 77FM continues until the finder switch brushes have been rotated to engage a particular set of terminals that connect to the calling subscriber line.

It is assumed that subscriber station "A" is connected through line circuit 100 to the upper level of contacts in the bank of linefinder 109; therefore, when the calling line is found, a circuit is completed from battery through the winding of cut-off relay 210, contacts 222 (both in line circuit 100) over conductor P1, brush 314, contacts 32A7, 33B6, a conductor marked "TEST A," cable 14, the winding of test "A" relay 76TA, diode 76D, contacts 76TB1, 76CM2, and the winding of finder motion relay 77FM to ground, thus operating relay 76TA and holding finder motion relay 77FM in an operated condition.

The continued operation of finder motion relay 77FM, keeps contacts 74FM1 open, thus preventing reoperation of rotary magnet 34RM and, therefore, stopping the switch motion.

Responsive to the operation of relay 76TA, contacts 75TA1 open to disconnect the winding of test "B" relay 75TB. Contacts 44TA3 close to operate switching relay 44SW. Contacts 69TA2 open to break one of the paths to equipment switch-through relay 68ES.

Means is provided for selecting the proper brushes or level in linefinder 109. In greater detail, upon the operation of switching relay 44SW, its "X" or preliminary contacts 44SW1 are the first to close, thereby preparing a holding circuit which extends through operated off-normal contacts 43ON of the level finding switch, to contacts 43ES1 which are now standing open. Contacts 67SW4 close to complete a second holding path through change motion relay 67CM. Contacts 69SW2 and 67SW3 break two points in the holding path through equipment switch-through relay 68ES. Since contacts 69TA2 are operated, the only holding circuit for relay 68ES is now extended through contacts 68TB2. Contacts 69TA2 and 69SW2 also release lower level relay 33B to select the upper set of brushes which are designated 310 and 312. That is, with relay 32A operated and relay 33B released, contacts 32B2, 32B7, 33A2 and 33A5 are closed while contacts 33B3 and 33B4 are open. Contacts 35B1 open to break the shunt across the talking conductors. Therefore, the heavily inked talking conductors are now extended through upper level brushes 310 and 312 from line circuit 100 to selector 120. Selection of the lower level brushes is described below. Also responsive to the release of lower level relay 33B, contacts 32B5 open to break the test circuit which is effective on calls through the lower level and contacts 33B6 open to release test "A" relay 76TA. When contacts 32B12 return to normal, the holding circuit for upper level relay 32A is transferred from the conductor marked "RLY. A" to the following circuit: busy and holding ground applied at contacts 321 of selector 120, conductor P, contacts 32B12, 32A3, and through the winding of upper level relay 32A to battery.

Equipment switch-through relay 68ES release when its circuit is broken at contacts 32B12. Contacts 43ES1 close to complete the holding circuit for relay 44SW such circuit also including contacts 43ON, 44SW1 and the winding of relay 44SW. Contacts 73ES8 open to break the holding circuit for relay 73FR. Contacts 68ES7 open to break the holding circuit for relay 71AS.

When equipment switch-through relay 68ES closes contacts 43ES1, a circuit is completed through operated off-normal contacts 43ON, interrupter contacts 44I and the winding of level finder magnet 450 to battery. Magnet 450 operates and opens interrupter contacts 44I to de-energize itself. Upon release of magnet 450, interrupter contacts 44I close, thus re-energizing the magnet. In this manner, wipers 202 and 204 are operated step-by-step to a normal position at which time off-normal contacts 43ON open to break the homing circuit; whereupon, level finder magnet 450 ceases its self-operation. Also, off-normal contacts 43ON open to restore switching relay 44SW.

If another line circuit is in a calling condition at this time, battery is applied to one of the common start leads of the "START CIRCUIT" (FIG. 2) so that control circuit 105 recycles to seize another linefinder and perform the functions described above.

The linefinder of FIG. 3 is completely disassociated from control circuit 105 which is now free to preselect the next linefinder. Throughout the remainder of the call that was described above, only upper level relay 32A is held operated from ground on sleeve or private conductor P. Upon release, sleeve ground is removed at contacts 321 and relay 32A releases to close contacts 36A6, thus operating release magnet 35ZM. The linefinder is now returned to normal.

TELEPHONE CALLS THROUGH THE LOWER LEVEL GROUP

If it is assumed that subscriber "B" is calling, the circuit functions as described above except that line circuit 101 extends a marking over wiper 315 through operated contacts 32B5, 33A4, test conductor "TEST B," cable 14, the winding of test "B" relay 75TB, contacts 75TA1, 76CM2 and the winding of finder motion relay 77FM to ground. When relay 75TB operates, it opens contacts 76TB1, thereby disabling test "A" relay 76TA. Contacts 68TB2 open to de-energize upper level relay 32A while holding lower level relay 33B is held operated. Contacts 32A7 open to disconnect test conductor P1 and contacts 33A4 open to transfer the holding circuit of lower level relay 33B to ground in selector 120 that is extended from contacts 321 over conductor P. Relay 75TB releases responsive to the release of relay 32A, in a manner similar to the release of relay 76TA as described above.

*Simultaneous calls.*—If it should happen that two calls occur simultaneously at subscriber station "A" and at subscriber station "B," the linefinder operates in the manner described above except that linefinder 109 finds one of the calls first. Responsive to the operation of test "A" relay 76TA or test "B" relay 75TB, which ever shall occur first, contacts 75TA1 or 76TB1 (as the case may be) are operated to disable the non-operated test relay, thus causing an unanswered calling condition to remain so that another linefinder is operated to find the unanswered calling line.

If two subscribers place calls simultaneously and both calling lines connect to the same set of finder terminals except that one is served by the upper brushes and the other is served by the lower brushes, both test "A" and test "B" relays 76TA and 75TB operate and each opens its contacts 75TA1 and 76TB1, as the case may be, to disassociate the other. If both test relays function at the same instant (an extremely remote possibility), the linefinder returns to normal and some other linefinder tries to answer the call. Usually, one of the relays operates or releases a little faster than the other so that one call is served. The other call is disassociated when test "A" relay 76TA or test "B" relay 75TB operates so that another finder may serve it.

ALL LINEFINDERS IN ONE GROUP BECOME BUSY

Means is provided for transferring the calling line control from association with a first group of linefinders to associate with the other group when all finders in the first group are busy. (Perhaps some of the description which follows may be clearer if occasional reference is made to FIG. 1.)

As each linefinder becomes busy, it removes ground from an ATB or "all trunks busy" conductor as at off-normal contacts 35ON, for example. As long as any ground appears on the ATB conductor (FIG. 5), it is an indication that there is an idle linefinder available; hence, "A" finder busy relay 57AD remains operated over a circuit extending from battery through resistor 57R, the winding of relay 57AD, and an all trunks busy conductor such as ATB1, for example, to ground in an idle linefinder.

If it is assumed that all linefinders are busy, the last free switch which is taken into use removes the last ground marking from the ATB conductor, as at contacts 35ON, for example. Thus, the original holding ground for the "A" finder busy relay 57AD is now disconnected. However, while the finder is being positioned, relay 57AD continues to hold briefly responsive to a ground marking which is extended from contacts 64ES3 through contacts 61ST2, 59AD2, and the winding of "A" finder busy relay 57AD to battery via resistor 57R. After the switch is positioned, and equipment switch-through relay 68ES releases, contacts 64ES3 open to restore relay 57AD if another linefinder has not marked conductor ATB indicating that it is now free.

Responsive to the release of "A" finder busy relay 57AD, contacts 59AD2 open in order that relay 57AD will only reoperate responsive to a ground marking on an ATB lead. When contacts 54AD4 close, conductor SR1 from the "B" control circuit 106 is connected to control relay 57AD. Contacts 55AD6 close to operate transfer "A" relay 56AB over an obvious circuit. Contacts 56AD1 close to transfer a start conductor 51 from association with "A" control circuit 105 to an association with the "B" control circuit 106.

When transfer relay 56AB operates, contacts 25AB8 close to transfer the level finder from the preference arrangement of group "A" linefinders at wiper 202 to the preference arrangement of group "B" linefinders at wiper 204. Contacts 42AB7 close but have no effect since contacts 42BL3 are open. Contacts 41AB1–6 operate but do not connect the "B" finders 110 to the "A" control circuit 105 since contacts 41BF1–6 are open; however, such operation of contacts 41AB1–6 isolates the "A" finders 109 from the "A" control circuit 105. As long as all "A" finders 109 remain busy, start signals as on conductor 10 cause "B" control circuit 106 to set-up connections through the use of group "B" linefinders 110.

When a group "A" linefinder becomes free, ground is reconnected to an ATB conductor as at off-normal contacts 35ON. The next function depends upon whether "B" control circuit 106 is in the process of setting up a call, in which case it would be undesirable for the "A" control circuit 105 to take over control immediately. Therefore, if a call is in progress, ground is connected by suitable relays (not shown) in "B" control circuit 106 via contacts corresponding to 64ES4 and 61ST1 to conductor SR1 and contacts 54AD4, thereby shunting "A" finder busy relay 57AD. The next time that "B" control circuit 106 is released, ground is momentarily removed from conductor SR1, thus allowing relay 57AD to operate over a circuit which may be traced from battery through resistor 57R, the winding of relay 57AD, and an ATB conductor similar to ATB1, to ground in an idle linefinder, as at contacts such as 35ON, for example. When relay 57AD operates, control circuit 105 is reconnected to control the group "A" finders 109.

Thus, it is seen that if all group "A" linefinders 109 become busy, all traffic is switched to group "B" finders for service. Upon restoration of the normal traffic conditions, the group "A" finders resume their normal function under the control of circuit 105.

ALL LINEFINDERS IN BOTH GROUPS BECOME BUSY

The telephone habits of a group of subscribers may be analyzed and enough linefinders may be provided so that an all finders busy condition occurs only during predictable periods of time, such as 1% of the time—as for example, during periods when subscribers rush to their telephones to report a fire. It is assumed for the purposes of the description that follows that all "A" linefinders are busy.

When all group "A" linefinders 109 become busy, relay 57AD operates, as described above. When all group "B" linefinders 110 become busy relay 52BD is controlled from the "B" group finders via all trunks busy conductors ATB2 in a manner that is similar to the control of relay 57AD described above. With both finder busy relays 52BD and 57AD in a released condition, a circuit is completed from ground through contacts 62AD5, 61BD5, and a conductor marked "ALARM." Since contacts 55BD1 and 56AD1 are now in the released condition shown in the drawings, no further start signals may be effective. No further calls may be extended through the system until a linefinder becomes idle at which time, the control circuit resumes its function in the manner described above.

FAULTY OPERATION

Means is provided for switching control functions from "A" control circuit 105 to "B" control circuit 106 if a fault should occur in circuit 105.

Switching relay 44SW controls the operation of release of equipment switch-through relay 68ES by means of contacts 57SW3 and 69SW2. Relay 68ES, in turn, controls the circuit from master ground on contacts 58AL2 which extends through contacts 65PB2, 68ES7, 68ST3, diode 67D and the lower winding of start relay 65ST to battery. In this manner, start relay 65ST may not release until switching relay 44SW releases. Therefore, if there is trouble and switching does not occur, the finder remains in an operated condition. Start relay 65ST operates upon the initiation of a call, as explained above, and contacts 65ST5 close to complete a circuit from battery through the right-hand winding of relay 64PA, contacts 64PA4, 65PB1, and 65ST5 to conductor S and timer 660. Any suitable means (not shown) is provided to start timer 660 responsive to such signals; however, relay 64PA does not operate. After a suitable time period has elapsed as measured by the timer, a solid ground potential is applied to the windings of alarm timing relay 64PA via conductor S, contacts 65ST5, 65PB1, 64PA4, and the right-hand winding of relay 64PA to battery. Responsive thereto, relay 64PA operates and closes contacts 63PA2 to connect the left-hand winding of relay 64PA and in series therewith the right-hand winding of relay 63PB to conductor Z and the timer.

A period of time elapses before any potential is applied to conductor Z. If, during this time, the linefinder switches through, equipment switch through relay 68ES releases before relay 73FR, thus breaking a circuit at contacts 61ES2 which extends from battery through the right-hand winding of alarm timing relay 64PA, operated contacts 64PA4, rest contacts 63PB3, and contacts 61ES2 and 62FR1 both of which are now standing open. Hence, relay 64PA releases. On the other hand, if the finder does not switch through, contacts 61ES2 remain closed and relay 64PA remains in an operated condition. After a period of time measured by timer 660, a ground potential is applied to conductor Z and relay 63PB operates over a circuit including contacts 63PA2, the right-hand winding of relay 63PB, the left-hand winding of relay 64PA, and battery.

Responsive to the operation of relay 63PB, contacts 65PB1 open to break the original path over which relay 64PA operated while contacts 63PB3 close to prepare a holding circuit for alarm timing relay 63PB. Relay 64PA is holding over its left winding and relay 63PB is holding over both windings. A circuit is now completed to operate allotter magnet 430 as follows: ground, operated contacts 62AD5, 63AL2, 61PB5 and 61PA3 to battery through the winding of magnet 430. Responsive thereto, the allotter wipers are driven to select an idle linefinder. At contacts 65PB2, relay 63PB also disconnects master ground for relay 68ES, 71AS, 72AM, and the lower winding of relay 65ST. Any of these relays that are operated, release at this time.

After a sufficient period of time has elapsed to insure operation of "A" control circuit 105 as described above, ground potential is removed from conductor Z. Responsive thereto, relay 64PA restores (contacts 65PB1 and 63PB3 being operated).

Responsive to the release of relay 64PA, contacts 63PA2 restore, thus breaking the holding circuit previously extended through the right-hand winding of relay 63PB. The allotter selects an idle linefinder after which the call is completed, all in the manner described above. Upon successful completion of the call, first relay 68ES and then relay 73FR release in the manner described above to restore relay 63PB.

On the other hand, if it is assumed that "A" control circuit 105 tries a second time to answer a calling line and fails, it may be assumed that control circuit 105—not the finder—is at fault. Since, the control circuit has already timed-out once, relay 63PB is operated and relay 64PA is unoperated. Therefore, if it is assumed that the second attempt to find the calling line is not completed within a predetermined period of time, ground once again appears on conductor Z. A circuit is completed from conductor Z through rest contacts 63PA2, 61PB4, and the lower winding of "A" failure relay 59AF to battery. Relay 59AF operates.

Incidentally, if the call being described were through the "B" group of finders, relay 51BF would be operated at this time.

Responsive to the operation of "A" failure relay 59AF, contacts 57AF7 close to complete a locking circuit through the upper winding of relay 59AF which may be traced as follows: ground, contacts 52BF7, contacts of manual key 537, contacts 57AF7, and the upper winding of "A" failure relay 59AF to battery. Relay 57AL operates in parallel with the circuit just described. Relay 59AF operates contacts 41AF1–6, thereby disconnecting the conductors of cable 14.

Responsive to the operation of relay 57AL, contacts 58AL2 open to remove master ground, thereby releasing any relays that may be operated. An alarm signal (not shown) may be transmitted responsive to the operation of relay 57AL, as required. Contacts 57AL1 switch a start conductor 51 from connection with "A" control circuit 105 to the control of the "B" control circuit. The "A" control circuit 105 is now out of service and all of its calls are being handled by the "B" control circuit.

After a service man has corrected any existing faults in control circuit 105, manual key 537 may be operated to release relays 57AL and 59AF, at which time "A" control circuit 105 is returned to normal operation.

BOTH CONTROL CIRCUITS OUT OF SERVICE

Means is provided for passing control back and forth between "A" and "B" control circuits 105 and 106 if both are out of service at the same time. Therefore, for the purposes of this description, it is assumed that "A" control circuit 105 is out of service (as described above) at a time when "B" control circuit 106 fails. Such failure is indicated by a ground marking that is returned from "B" control circuit 106 over conductor LD1 at a time when "A" failure relays 57AL and 59AF are operated. If contacts 52BF7 are in the position shown in the drawings and contacts 57AF7 are operated, the upper winding of urgent alarm relay 55UA is shunted. However, when contacts of both relays are operated, thus indicating faults in both the "A" and "B" control circuits, the upper winding of urgent alarm relay 55UA is no longer shunted. Therefore, upper windings of failure relays 59AF and 51BF and the windings of relays 57AL and 52BL are connected in parallel through the upper winding of urgent alarm relay 55UA, contacts 54UA2 and manual key 537 to ground. Responsive thereto, relay 55UA operates, and locks through its lower winding at contacts 54UA2. The circuit including the windings of relays 51BF, 52BL, 57AL and 59AF is broken when urgent alarm relay 55UA operates contacts 54UA2; however, since it is assumed that "A" control circuit 105 went out of service before "B" control circuit 106, "B" failure relays 51BF and 52BL continue to be held by ground potential that is being applied to a conductor corresponding to the Z (FIG. 6) lead by a timer corresponding to item 660. Therefore, only "A" failure relays 59AF and 57AL restore at this time.

Upon the release of relay 59AF, contacts 57AF7, apply ground to complete a holding circuit for "B" failure relays 51BF and 52BL. With relays 57AL and 59AF restored, "A" control circuit 105 is returned to operation. If, "A" control circuit 105 times-out again, "B" control circuit 106 is returned to service. In this manner, the two control circuits repeatedly try to control the linefinders until the faults are eventually cleared by a maintenance man and manual key 537 is operated.

CONTROL CIRCUIT OUT OF SERVICE WITH ALL FINDERS IN GROUP BUSY

Means is provided for giving one control circuit access to linefinders of both groups, as required. If one control circuit is withdrawn from service as by the operation of failure relays 57AL and 59AF, for example, the other control circuit handles all calls by means of its associated linefinders. If, under these conditions, all of the linefinders normally associated with the operative control circuit become busy, the operative control circuit is transferred from association with its group of linefinders to association with the other group of linefinders.

For the purposes of this description, it is assumed that relays 59AF and 57AL are operated to remove "A" control circuit 105 from service, and that "B" control circuit 106 is associated with the "B" linefinder group 110 to handle all calls. Lastly, it is assumed that all of group "B" finders are busy. Therefore, relay 52BD releases in a manner which is similar to the release of relay 57AD as explained above in the section entitled, "All Linefinders in One Group Become Busy."

When "B" finder busy relay 52BD releases, contacts 55BD6 close to operate transfer relay 56BB over an obvious circuit. Responsive to any start signal transmitted through the start circuit (FIG. 2), a marking is given to "B" control circuit 106 over either operated contacts 55BD1 or released contacts 56AD1 depending upon whether the calling line is connected to levels 1—5 or 6—0.

The "B" control circuit 106 is now conditioned to select and control finders from group "A." In "B" control circuit 106, contacts corresponding to 42AB7 are closed when relay 56BB operates and contacts corresponding to 42BL3 are closed when relay 57AL operates. In this manner, the allotter associated with "B" control circuit 106 selects the bank which establishes the normal preference for the various linefinders in group "A."

With relays 59AF, and 56BB operated, the various control conductors in cable 14 extending from "A" finders 109 are switched through contacts 41AF1–6 and 41BB1–6 from connection with "A" control circuit 105 and connection with "B" control circuit 106. At contacts (not shown) controlled by transfer relay 56BB (which correspond to contacts 25AB8) the level finding bank in "B" control circuit 106 is switched from the left-hand to the right-hand positions in order that the "A" finders may operate on the first five levels of preference even though controlled by "B" control circuit 106.

UNIQUE TYPES OF SERVICE

Means is provided for giving unique service to different types of calling subscriber lines. For example, certain lines have restricted access, metered service or other conditions which must be accommodated. The invention contemplates the use of extra banks on level finder switches 15 and 16 (FIG. 1) to identify the types of calls. For the purposes of this description, it is assumed that one type of line is a "lockout" line and the other type of line is a "non-lockout" line.

The term "lockout" describes a line circuit which is effective to prevent a needless operation of a linefinder when switching equipment to which the line circuit is connected (e.g. linefinder and subsequent switches, or connector and preceding switches) releases, with the subscriber's telephone in the "off-hook" condition. This may occur upon timed disconnect of a primary link following seizure without dialing, on completion of conversation timing, during a revertive call, etc., or to a called subscriber's line circuit when the calling subscriber clears first.

The term "non-lockout" describes a line circuit which operates a linefinder any time the line is in the calling condition and is not already connected to switching equipment, as a linefinder or connector.

In order to provide mixed lockout and non-lockout service, the various line circuits are assigned by levels which are marked accordingly. When a call is made, the finder is controlled in the manner described above, to step vertically to a level in which the calling line is connected.

First, it is assumed that a call is being extended through a lockout line circuit, that conductor 420 is connected to conductor P, and that wiring "W" (FIG. 2) is used. Vertical test relay 69VT operates in the manner explained above. Responsive thereto, contacts 46VT3 close to extend a battery marking over a circuit which may be traced from battery through resistor 46R, contacts 46ES9, 46VT3, 26AD3, wiring "W," level finder bank and brush 240, allotter brush and bank 107A, conductors 420 and P to the first selector 120. Any suitable means in selector 120 (not shown) operates to provide for lockout. Shortly after, the marking is extended over wire "W," as explained above, it is removed by operation of change motion relay 67CM and release of vertical test relay 69VT, i.e. contacts 46VT3 open. If a line served by a lockout line circuit is permanently seized the selector recognizes the line as a lockout line by the above described discriminating signal and commences to time a disconnect function to release the primary link.

Figure 2:
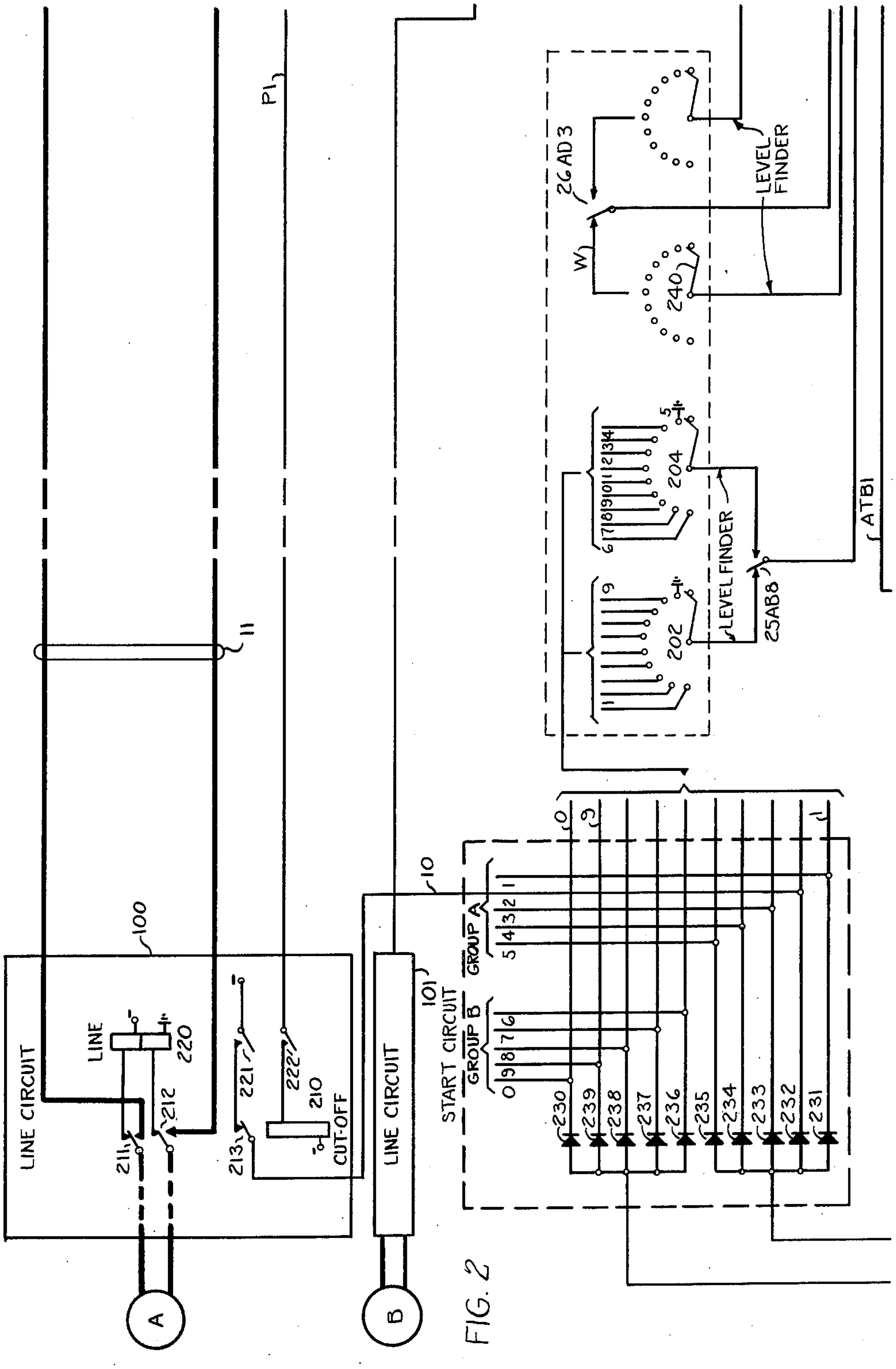
FIG. 2 shows the details of line and start circuits.

If it is assumed that the calling subscriber is served on a non-lockout basis, there is no wiring "W" (FIG. 2). Therefore, no battery marking is projected over conductor P to selector 120 during the period while the finder is changing-over from vertical to rotary motion. Selector 120 does not operate to provide for lockout. If a line served by a non-lockout line circuit is permanently seized, the selector recognizes the line as a non-lockout line by the above described discriminating signal and sends a supervisory alarm. For one example of a suitable lockout line circuit which may be used in conjunction with the subject case, see a co-pending application entitled "Balanced Lockout Line Circuit," S.N. 826,571 filed July 13, 1959, by Horwitz, Cox and Westhead and assigned to the assignee of the subject invention.

While the foregoing description relates to a specific embodiment of the invention, it is thought that those skilled in the art may readily substitute other devices for those described. Therefore, it is to be clearly understood that this description is made only by way of example and not as a limitation on the scope of the appended claims.

We claim:

1. In a telephone system, means for finding calling lines, said finding means comprising two relays, control means for operating said finding means, means responsive to the operation of both of said relays for interconnecting said finding means and said control means, means responsive to signals transmitted between said finding means and said control means for partially completing the finding of a calling line, means for releasing one of said relays responsive to said last named means, and means responsive to said release of said one relay for completing the finding of said calling line and for connecting the other of said relays to hold said finding means operated for the duration of a call.

2. The telephone system of claim 1 wherein said means for finding calling lines comprises a two motion switch, a single motion auxiliary switch common to a group of said two motion switches, means for operating said auxiliary switch simultaneously with one motion of said two motion switch, said auxiliary switch comprising a bank of contacts, means for selectively marking said bank of contacts to said one motion, and means responsive to said marking for stopping said one motion.

3. The telephone system of claim 2 wherein said auxiliary switch comprises at least two banks of contacts and means responsive to markings in the other of said banks of contacts for preparing for unique circuit operations.

4. The telephone system of claim 1 and means responsive to the completion of said call for releasing said other relay to disconnect said calling line.

5. In a telephone system, means for finding calling lines, said finding means comprising two sets of brushes and two relays, control means for operating said finding means, means responsive to operation of both of said relays for interconnecting said finding means and said control means, means responsive to signals transmitted between said finding means and said control means for causing said brushes to be positioned for making connection with a calling line, means responsive to said connection with said calling line for releasing one of said relays, and means responsive to said release of said one relay for selectively connecting one set of said brushes to extend said calling line and for connecting the other of said relays to hold said finding means operated for the duration of a call.

6. The telephone system of claim 5 and means responsive to the completion of said call for releasing said other relay to disconnect said calling line.

7. A telephone system comprising a plurality of subscriber lines divided into first and second groups, a plurality of means for finding calling lines divided into first and second groups, all of said lines being multiplied to all of said finding means, means for connecting said first group of finding means to give preference to said first group of subscriber lines, means for connecting said second group of finding means to give preference to said second group of subscriber lines, first control means normally individual to said first group of finding means, second control means normally individual to said second group of finding means, means associated with each of said control means for preselectively connecting an idle one of said finding means to said control means with which said idle finding means is normally associated, means responsive to the initiation of a call on one of said lines for starting the control means that is normally individual to the one of said of groups of finding means that is connected to prefer said one line, means responsive to said last named means for operating said preselected finding means associated with said started control means, means effective when all finding means in one of said groups are busy for starting the other of said control means responsive to the initiation of a call in the group of lines normally preferred by said one group of finding means, and means responsive to said last named means for operating said preselected finding means associated with said other control means to find said one line.

8. The telephone system of claim 7 wherein each of said means for finding calling lines comprises a two motion switch, a single motion auxiliary switch common to said plurality of finding means, means for operating said auxiliary switch simultaneously with one motion of a selected one of said two motion switches, said auxiliary switch comprising a bank of contacts, means for selectively marking said bank of contacts according to said one motion, and means responsive to said marking for stopping said one motion.

9. The telephone system of claim 8 wherein said auxiliary switch comprises at least two banks of contacts and means responsive to markings in the other of said banks of contacts for preparing for unique circuit operations.

10. A telephone system comprising a plurality of subscriber lines divided into groups, a plurality of finder means each including a two motions switch for finding calling lines, a single motion auxiliary switch common to said plurality of finder means, said finder means being divided into groups, means for connecting all of said lines to all of said finder means, each of said groups of said subscriber lines normally being connected to be preferred by a different group of said finder means, a plurality of control means for controlling the operation of individual finder means, each of said groups of said finder means normally being individual to one of said control means, preselector means for individually connecting an idle finder means in each of said groups to its normally associated control means, means responsive to the initiation of a call on one of said lines for causing one of said control means to operate a preselected finder means normally connected to serve said calling line, means for simultaneously operating said auxiliary switch and a selected one of said two motion switches in its primary direction, said auxiliary switch comprising a bank of contacts, means for selectively marking said bank of contacts according to the desired primary switch motion, means responsive to said marking for stopping said switch motion, and means responsive to a fault in said one control means for transferring control of said finder means to another of said control means.

11. The telephone system of claim 10 wherein said auxiliary switch comprises at least two banks of contacts and means responsive to markings in the other of said banks of contacts for preparing for unique circuit operations.

12. A telephone system comprising a plurality of subscriber lines divided into groups, a plurality of means for finding calling lines, said finder means being divided into groups, means for connecting all of said lines to all of said finder means, each of said groups of said subscriber lines being normally connected to be preferred by a different group of said finder means, a plurality of control means for controlling the operation of individual finder means, each of said groups of finder means normally being individual to one of said control means, preselector means for individually connecting an idle finder means in each of said groups to its normally associated control means, means responsive to the initiation of a call on one of said lines for causing one of said control means to operate a preselected finder means normally connected to serve said calling line, means responsive to a fault in said one control means for transferring control of said finder means to another of said control means, and means responsive to a fault condition in said other control means for reconnecting said one control means to control all of said finder means.

13. A telephone system comprising a plurality of linefinders divided into groups, a plurality of control means, each of said control means being normally individually associated with a corresponding one of said groups of linefinders, means for connecting said control means to operate linefinders of said associated group, means responsive to a fault condition in a first of said control means for transferring control of all of said linefinders to another of said control means, and means responsive to fault conditions in said other control means for connecting all of said linefinders to be controlled by said first control means.

14. The telephone system of claim 13 and means responsive to continued faults in both of said control means for repeatedly and alternately connecting said control means to operate linefinders in all of said groups.

15. In a telephone system, means for finding calling lines comprising a plurality of two motion switches, a single motion auxiliary switch common to a group of said two motion switches, means for simultaneously operating said auxiliary switch and a preselected one of said two motion switches, said auxiliary switch comprising a plurality of banks of contacts, means responsive to markings in one of said banks for controlling said preselected two motion switch, and means responsive to markings in another of said banks to prepare for unique operations.

16. In a telephone system, means for extending connections in said telephone system comprising a plurality of two motion switches, means comprising at least one auxiliary switch common to said two motion switches, means for operating said auxiliary switch simultaneously with the motion of a selected one of said two motion switches, said auxiliary switch comprising a bank of contacts, and means for selectively marking said bank of contacts to control said selected two motion switch.

17. A telephone system comprising a plurality of subscriber lines divided into first and second groups, a plurality of linefinders divided into first and second groups, all of said lines being connected to all of said linefinders, means for causing said first group of linefinders to give preference to said first group of subscriber lines, means for causing said second group of linefinders to give preference to said second group of subscriber lines, first control means normally coupled to control said first group of linefinders, second control means normally coupled to control said second group of linefinders, means associated with each of said control means for preselecting an associated idle one of said linefinders, each of said linefinders comprising two relays, means responsive to the operation of both of said relays in said preselected linefinder for interconnecting said preselected linefinder and said associated control means, means responsive to signals transmitted between said linefinder and said control means for partially completing the finding of a calling line, means for releasing one of said relays responsive to said last named means, means responsive to said release of said one relay for completing the finding of said calling line and for connecting the other of said relays to hold said linefinder operated for the duration of a call, means effective when all linefinders in one of said groups are busy for starting said control means associated with the other of said groups of linefinders, and means responsive to said last named means for operating said preselected linefinder in said other group to find said calling line, whereby said linefinders of both of said groups have one hundred percent accessibility to all lines.

18. A telephone system of claim 17 and means responsive to the completion of said call for releasing said other relay to disconnect said calling line.

19. A telephone system comprising a plurality of subscriber lines divided into first and second groups, a plurality of linefinders divided into first and second groups, each of said linefinders having a bank of terminals, means for connecting said subscriber lines to said terminals in said first group of linefinders in one order to give preference to said first group of subscriber lines, means for connecting said subscriber lines to said terminals in said second group of linefinders in a different order to give preference to said second group of subscriber lines, first control means normally associated with said first group of linefinders, second control means normally associated with said second group of linefinders, means associated with each of said control means for preselecting an associated idle one of said linefinders, each of said linefinders comprising two relays, means responsive to the operation of both of said relays in said preselected linefinder for interconnecting said preselected linefinder with said associated control means, means responsive to signals transmitted between said linefinders and said control means for partially completing the finding of a calling line, means for releasing one of said relays responsive to said last named means, means responsive to said release of said one relay for completing the finding of said calling line and for connecting the other of said relays to said relays to hold said preselected linefinder for the duration of a call, means effective when all linefinders in one of said groups are busy for starting said control means associated with the other of said groups of linefinders, means responsive to said last named means for operating a preselected linefinder associated with said last named control means to find said calling line, and means responsive to a fault condition in one of said control means for connecting the other of said control means to control said linefinders in both said groups of linefinders.

20. The telephone system of claim 19 wherein each of said linefinders comprises a two motion switch, a single motion auxiliary switch common to said two motion switches, means for operating said auxiliary switch simultaneously and with primary switch motion of one of said two motion switches, said auxiliary switch comprising a bank of contacts, means for selectively marking said bank of contacts according to the desired primary switch motion, and means responsive to said marking for stopping said primary switch motion.

21. The telephone system of claim 19 and means responsive to a fault condition in said other control means for reconnecting said one control means to control all of said linefinders.

22. In a telephone system, a plurality of linefinding means divided into groups, said linefinding means comprising upper and lower brushes and two relays, a plurality of control circuits, each of said control circuits normally being individual to a group of said finding means, means responsive to the operation of both of said relays in one of said finding means for connecting one of said control circuits to operate said one finding means, means responsive to a fault condition in said one control circuit for transferring control of all of said finding means to another of said control circuits, means responsive to a fault in said other control circuit for connecting all of said finding means to be controlled by said one control circuit, means responsive to signals transmitted between said finding means and an associated one of said control circuits for causing said brushes to be positioned for making connection with a calling line, means responsive to said connection with said calling line for releasing one of said relays, and means responsive to said release of said one relay for selectively connecting either said upper or said lower brushes to extend said calling line and for connecting the other of said relays to hold said finding means operated for the duration of a call.

23. The telephone system of claim 22 and means responsive to continued faults in both of said control circuits for repeatedly and alternately connecting said control circuits to operate all of said finding means.

24. The telephone system of claim 22 and means responsive to the completion of said call for releasing said other relay to disconnect said calling line.

References Cited in the file of this patent

UNITED STATES PATENTS

| | | |
|---|---|---|
| 2,214,908 | Lomax et al. | Sept. 17, 1940 |
| 2,289,896 | Bakker | July 14, 1952 |